April 9, 1968  J. FINLEY  3,376,649

GAGING APPARATUS

Filed Dec. 30, 1966

INVENTOR.
JAMES FINLEY

BY Donnelly, Mentag & Harrington
ATTORNEYS

United States Patent Office 3,376,649
Patented Apr. 9, 1968

3,376,649
GAGING APPARATUS
James Finley, Livonia, Mich., assignor to Hanlo Gage and Engineering Company, Southfield, Mich., a corporation of Michigan
Filed Dec. 30, 1966, Ser. No. 606,437
5 Claims. (Cl. 33—147)

ABSTRACT OF THE DISCLOSURE

A gaging apparatus for checking grooves, bores, linear dimensions, inside and outside dimensions, and the like, and which includes a stationary body member, a slide plate movably mounted on said body member, integral means mounted on the stationary body member, a U-shaped spring means for biasing the slide plate against the indicator, a first gaging contact finger releasably fixed on the stationary body member, and a second gaging contact finger mounted on the movable slide plate in a position spaced apart from said first gaging contact finger, and said U-shaped spring means being adapted to be swung from one operative position to another operative position to bias the slide plate in one direction or the other depending on whether the gaging apparatus is being used for gaging an internal dimension or an external dimension.

---

This invention relates to the gage art, and more particularly, to a novel and improved gage which can be used for checking grooves, bores, linear dimensions, inside and outside dimensions, and the like.

Heretofore, attempts have been made to provide gages for checking various type dimensions by means of an indicator and a movable slide mounted on a fixed body with a pair of contact fingers, with one contact finger on the body and the other on the movable slide. Such prior art gages are adapted to be changed from one position for checking inside dimensions to another position for checking outside dimensions. However, the changing of the prior art gages from one set-up for checking inside dimensions to another set-up for checking outside dimensions is time consuming and requires extra parts. This time consuming operation for changing the prior art gages from one type of gaging operation to another is a disadvantage. In view of the foregoing, it is an important object of the present invention to provide a novel and improved gage which overcomes the disadvantages of the aforementioned prior art gages.

It is another object of the present invention to provide a novel and improved all-purpose gage which may be used for checking inside and outside dimensions and which can be changed from one set-up for checking inside dimensions to another set-up for checking outside dimensions in a quick and easy manner.

It is a further object of the present invention to provide a novel and improved all-purpose gage for checking inside dimensions, outside dimensions, and the like, which is simple and compact in construction, economical to manufacture, and efficient in operation.

It is still a further object of the present invention to provide a novel and improved all-purpose gage which includes a stationary body member, a slide member movably mounted on said body member, an indicator means mounted on the stationary body member; means for biasing the slide member against the indicator, including a U-shaped spring means; and a first gaging contact finger mounted on the stationary body member, and a second gaging contact finger mounted on the movable slide member in a position spaced apart from said first finger.

Other objects, features and advantages of this invention will be apparent from the following detailed description, appended claims, and the accompanying drawing.

In the drawing:
FIG. 1 is an elevational section view of an all-purpose gage made in accordance with the principles of the present invention, taken along the line 1—1 of FIG. 2, and looking in the direction of the arrows;

Figure 1:
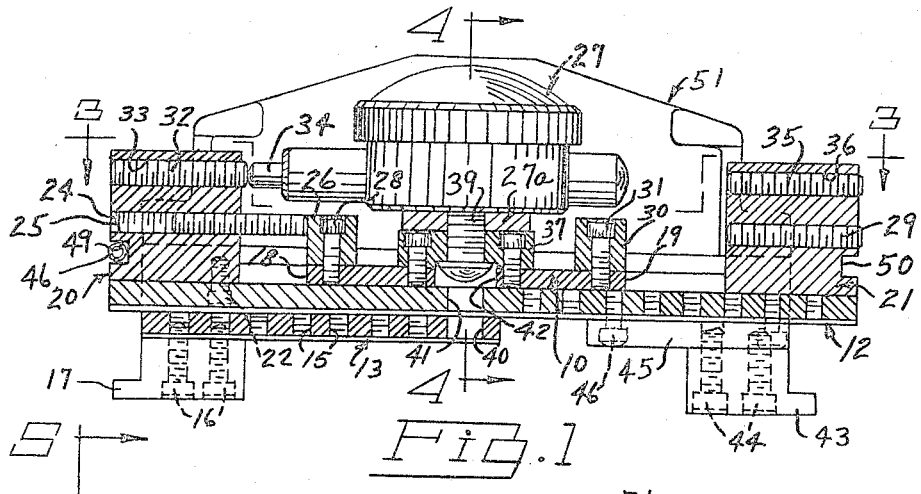
Figure 3:
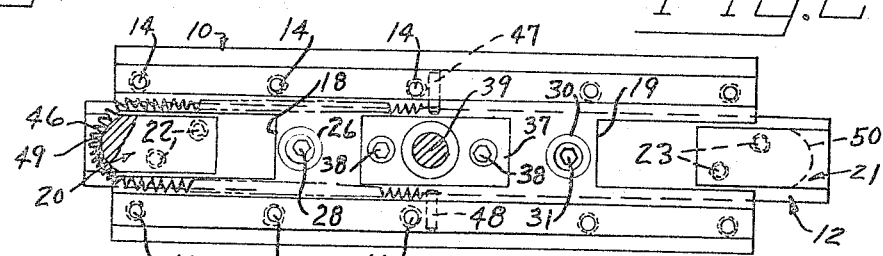
FIG. 3 is a horizontal plan view of the gage structure shown in FIG. 1, taken along the line 3—3 thereof, and looking in the direction of the arrows.
Figures 4, 5:
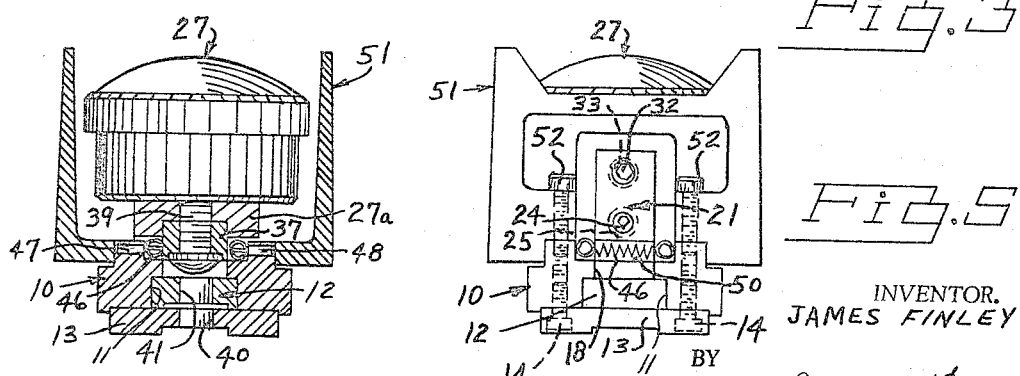
FIG. 4 is an elevational section view of the structure in FIG. 1, taken along the line 4—4 thereof, and looking in the direction of the arrows; and, FIG. 5 is a left end elevational view of the structure illustrated in FIG. 2, taken along the line 5—5 thereof, and looking in the direction of the arrows.

Referring now to the drawings, and in particular to FIGS. 3 and 4, the numeral 10 generally designates an elongated stationary main body member which is provided on the lower side thereof with a longitudinally extended rectangularly shaped recess 11. Slidably mounted in the recess 11 is an elongated, rectangularly shaped slide plate, generally indicated by the numeral 12. As best seen in FIGS. 1, 4 and 5, the slide plate 12 is retained in the recess 11 by a stationary cover plate 13 which extends longitudinally under the main body 10. The cover plate 13 is secured to the bottom of the main body 10 by a plurality of socket head screws 14, as shown in FIG. 3.

As shown in FIG. 1, the cover plate 13 is provided with a plurality of longitudinally spaced apart threaded holes 15 for the reception of screws, as 16, for securing to said cover plate a gage contact finger 17. It will be understood, that any type of gaging contacts may be secured to the cover plate 13, in accordance with the type dimension to be gaged. The illustrative gaging finger 17 is disposed for checking inside dimensions or inner diameter dimensions.

As shown in FIG. 3 the body member 10 is provided at each end thereof with inwardly extended cutouts or openings as indicated by the numerals 18 and 19. These cutouts communicate with the elongated slide plate recess 11.

Figure 2:
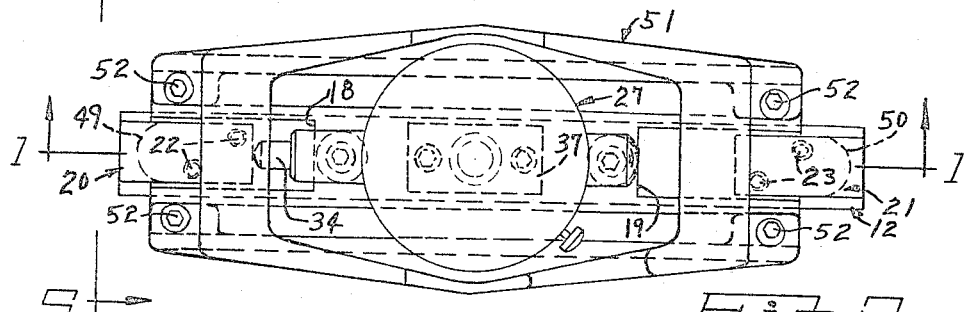
FIG. 2 is a top plan view of the gage structure shown in FIG. 1.

As best seen in FIG. 1, a first indicator adjustment block 20 is mounted on the left end of the slide plate 12, and a second indicator adjustment block 21 is mounted on the right end of slide plate 12. The indicator adjustment blocks 20 and 21 are secured to the slide plate 12 by any suitable means, as by the socket head screws 22 and 23, respectively. As shown in FIG. 2, the indicator adjustment blocks 20 and 21 are adapted to slide into the openings 18 and 19 in the main body 10 when the slide plate 12 is moved longitudinally of the main body 10.

As shown in FIG. 1, the indicator adjustment block 20 is provided with a first screw 24 which is threadably mounted in the horizontal threaded bore 25. The screw 24 is adapted to be threaded inwardly to abut the cylindrical stop member 26 for limiting the inward movement, or movement to the right as viewed in FIG. 1, of the slide plate 12. The slide plate overtravel adjustment screw 24 prevents the slide plate 12 from traveling further than the stem movement of the indicator gage generally indicated by the numeral 27. The stop 26 is secured to the main body member 10 by any suitable means, as by the socket head screw 28. The second indicator adjustment block 21 is provided with a similar overtravel adjustment screw 29 that is adapted to abut the stop member 30 that is secured to the main body 10 by the screw 31 in a longitudinally spaced apart position from the stop 26.

The stops 26 and 30 are on opposite sides of the indicator 27.

As shown in FIG. 1, the indicator adjustment block 20 is provided with a second screw 32 which is disposed above the screw 24 and threadably mounted in the threaded bore 33. The screw 32 is adapted to engage the stem or button 34 of the conventional indicator 27. The other indicator adjustment block 21 is also provided with a second screw 35 that is threadably mounted in the horizontal bore 36, and which is adapted to engage the indicator stem 34 when the indicator is turned around for gaging outside dimensions or outer diameter dimensions.

As shown in FIGS. 1 and 3, an indicator mounting plate 37 is secured to the main body 10 at a central position thereon by a pair of socket head screws 38. The base 27a of the dial indicator 27 is seated on the plate 37. The dial indicator 27 is secured to the mounting plate 37 by the button head screw 39. The operator of the gage is provided with access to the head of the screw 39 by means of the holes 40 and 41 formed through the cover plate 13 and the main body 10, respectively. The holes 40 and 41 communicate with the central opening 42 in the body 10, and in which is seated the head of the screw 39.

As shown in FIG. 1, a second gage contact finger 43 is secured by the socket head screws 44 to a gage contact carrying plate 45 that is in turn secured to the bottom of the slide plate 12 by the socket head screws 46.

As best seen in FIG. 3, the slide 12 is normally biased in one direction or the other into contact with the dial indicator stem 34 through one of the indicator adjustment blocks 20 or 21. As shown in FIGS. 1 and 3, the slide 12 is biased to the right by means of the U-shaped coil spring 46, so as to move the screw 32 carried on the indicator adjustment block 20 into engagement with the dial indicator stem 34. The free ends of the spring 46 are connected to the two anchor pins 47 and 48 which are fixed in two transverse, aligned holes in the body 10. The spring 46 extends to the left and around the indicator block 20 so as to move the slide 12 to the right, as viewed in FIGS. 1 and 2, to bring the screw 32 into engagement with the dial indicator stem 34. The indicator adjustment block 20 is provided on the outer end thereof with the recess 49 which has a convexly shaped inner end wall around which the spring 46 is seated. The other indicator adjustment block 21 is provided with a similar recess 50 for the reception of the spring 46 when the gage is set up or adjusted for checking outside dimensions and the like.

The gage is provided with a cover generally indicated by the numeral 51 in FIGS. 1 and 2. The cover 51 is secured to the base or main body member 10 by a plurality of socket head screws 52.

As shown in FIGS. 1 and 2 the contact fingers 17 and 43 are disposed with the fingers facing outwardly so that the gage may be used for checking an inner diameter or an inner dimension. The spring 46 is mounted round the dial indicator adjustment block 20 so as to move the slide plate 12 to the right and maintain a pressure on the indicator stem 34. The gage of the present invention may be quickly and easily changed for checking an outside dimension by merely reversing the positions of the gage contact fingers 17 and 43, that is, by putting the gage contact finger 17 on the plate 45 and the gage contact finger 43 on the cover plate 13. The spring 46 is also swung about the pins 47 and 48 so as to bring it to the right hand position, as viewed in FIG. 3, with the spring disposed in the recess 50 in the indicator adjustment block 21 so as to bias the slide plate 12 to the left. The dial indicator 27 is also turned so that its stem 34 will then engage the screw 35 in the block 21. The adjustment of the dial indicator 27 to the new position, and the swinging of the spring 46 to the new position may be quickly and easily accomplished by removing the guard 51.

While it will be apparent that the preferred embodiment of the invention herein disclosed is well calculated to fulfill the objects above stated, it wil be appreciated that the invention is susceptible to modification, variation and change without departing from the proper scope or fair meaning of the subjoined claims.

What is claimed is:

1. A gaging apparatus comprising:
 (a) an elongated stationary body member;
 (b) a longitudinally extended recess formed on the bottom side of said elongated body member;
 (c) a slide plate slidably mounted in said recess;
 (d) a first gaging contact means releasably fixed to said body member;
 (e) a second gaging contact means secured to said slide plate in a position longitudinally spaced apart from said first gaging means;
 (f) a dial indicator adjustably mounted on said body member; and,
 (g) a U-shaped spring means having the free ends thereof swingably attached to the body member by two anchor pins at an intermediate position thereon, and the bight end thereof mounted around one end of said slide plate to normally bias the slide plate in one direction into operative engagement with said dial indicator and the second gaging means into contact with an internal surface for checking an internal dimension, and said U-shaped spring means being swingable about said anchor pins to position the bight end of the U-shaped spring means about the other end of said slide plate to bias the slide plate in the other direction into operative engagement with the dial indicator and the second gaging means into contact with an external surface for checking an external dimension.

2. A gaging apparatus comprising:
 (a) an elongated stationary body member;
 (b) a longitudinally extended recess formed on the bottom side of said elongated body member;
 (c) a slide plate slidably mounted in said recess;
 (d) a first gaging contact means secured to said body member;
 (e) a second gaging means secured to said slide plate in a position longitudinally spaced apart from said first gaging means;
 (f) a dial indicator adjustably mounted on said body member;
 (g) a U-shaped spring means having the free ends thereof attached to the body member at an intermediate position thereon, and the bight end thereof mounted around one end of said slide plate to normally bias the slide plate into operative engagement with said dial indicator;
 (h) said slide plate being provided with a dial indicator adjustment block on each end thereof; and,
 (i) each of said dial indicator adjustment blocks being provided with a first threadably mounted screw for operative engagement with the dial indicator.

3. A gaging apparatus as defined in claim 2, wherein:
 (a) each of said dial indicator adjustment blocks is provided with a second threadably mounted screw for adjusting the position of the slide plate relative to the dial indicator when the slide plate is biased by said spring into engagement with the dial indicator.

4. A gaging apparatus as defined in claim 2, wherein:
 (a) said U-shaped spring means is mounted around one of the dial indicator adjustment blocks for biasing the slide plate into operative engagement with said dial indicator.

5. A gaging apparatus comprising:
 (a) an elongated stationary body member;
 (b) a longitudinally extended recess formed on the bottom side of said elongated body member;
 (c) a slide plate slidably mounted in said recess;

(d) a first gaging contact means secured to said body member;
(e) a second gaging contact means secured to said slide plate in a position longitudinally spaced apart from said first gaging means;
(f) a dial indicator adjustably mounted on said body member;
(g) a U-shaped spring means having the free ends thereof attached to the body member at an intermediate position thereon, and the bight end thereof mounted around one end of said slide plate to normally bias the slide plate into operative engagement with said dial indicator;
(h) said elongated recess along the bottom of said body member being open on the bottom end thereof; and,
(i) a cover plate being detachably secured to the bottom of said body member to retain said slide plate in said recess.

References Cited

UNITED STATES PATENTS

| | | |
|---|---|---|
| 1,911,442 | 5/1933 | Earl. |
| 2,087,896 | 7/1937 | Blomstrom. |
| 2,388,582 | 11/1945 | Sorensen. |
| 2,412,421 | 12/1946 | Polk et al. |
| 2,427,924 | 9/1947 | Rose. |
| 2,805,481 | 9/1957 | Locke _____ 33—147 X |
| 2,876,550 | 3/1959 | Tomkow. |
| 2,913,757 | 11/1959 | Quinn _____ 267—1 X |
| 3,054,189 | 9/1962 | Coulson _____ 33—147 |
| 3,067,520 | 12/1962 | Geraghty. |
| 3,086,292 | 4/1963 | Eisele. |
| 3,104,470 | 9/1963 | Plante. |

FOREIGN PATENTS 726,176　2/1932　France.

HARRY N. HAROIAN, *Primary Examiner.*